(12) United States Patent
Mohlencamp

(10) Patent No.: US 9,649,996 B1
(45) Date of Patent: May 16, 2017

(54) RECREATIONAL VEHICLE HOLDING TANK DISPOSAL SYSTEM

(71) Applicant: David B. Mohlencamp, Big Lake, MN (US)

(72) Inventor: David B. Mohlencamp, Big Lake, MN (US)

(*) Notice: Subject to any disclaimer, the term of this patent is extended or adjusted under 35 U.S.C. 154(b) by 263 days.

(21) Appl. No.: 14/562,726

(22) Filed: Dec. 7, 2014

Related U.S. Application Data

(60) Provisional application No. 61/921,523, filed on Dec. 29, 2013.

(51) Int. Cl.
*F16L 15/02* (2006.01)
*B60R 15/00* (2006.01)

(52) U.S. Cl.
CPC .................................. B60R 15/00 (2013.01)

(58) Field of Classification Search
USPC .................................. 285/302, 298; 138/106
See application file for complete search history.

(56) References Cited

U.S. PATENT DOCUMENTS

| | | | |
|---|---|---|---|
| 4,180,102 A * | 12/1979 | Larkin | B60R 15/00 138/106 |
| 4,223,702 A * | 9/1980 | Cook | E03F 1/008 137/355.12 |
| 4,650,224 A * | 3/1987 | Smith | E03F 1/008 137/899 |
| 4,779,650 A * | 10/1988 | Sargent | B60R 15/00 137/599.02 |
| 4,844,121 A * | 7/1989 | Duke | B67D 7/002 137/355.16 |
| 4,854,349 A * | 8/1989 | Foreman | B60R 15/00 137/355.16 |
| 5,323,813 A * | 6/1994 | Barrett | F16L 27/12 137/899 |
| 6,123,367 A * | 9/2000 | Miller | B60R 15/00 137/899 |
| 2003/0030274 A1* | 2/2003 | Kennedy | E03F 1/008 285/145.5 |
| 2006/0284422 A1* | 12/2006 | Lunder | F16L 27/08 285/401 |
| 2016/0061359 A1* | 3/2016 | Grech | B60R 15/00 285/179 |

* cited by examiner

*Primary Examiner* — Aaron Dunwoody
(74) *Attorney, Agent, or Firm* — Dave Alan Lingbeck

(57) ABSTRACT

A RV holding tank disposal system for disposing of waste more quickly, cleaner and more sanitarily. The RV holding tank disposal system includes a duct assembly including a first pipe with inlet and outlet ends and a bore extending therethrough, a second pipe with an open first end, a second end, and a bore extending therethrough with the second pipe in operable communication with the first pipe, and a flexible hose with open first and second ends and a bore extending therethrough with the flexible hose fastened at the inlet end of the first pipe; a holding tank connector assembly connected to the duct assembly and adapted to be removably connected to a RV sewage holding tank; and a sewer adapter attachable to the duct assembly and adapted to be removably disposed in a sewer inlet.

11 Claims, 3 Drawing Sheets

RECREATIONAL VEHICLE HOLDING TANK DISPOSAL SYSTEM

CROSS-REFERENCE TO RELATED APPLICATIONS

The present application claims priority to the provisional application Ser. No. 61/921,523, filed on Dec. 29, 2013, the disclosure of which is expressly incorporated by reference herein in its entirely.

BACKGROUND OF THE INVENTION

Field of the Invention

The present invention relates to holding tank disposal apparatuses and more particularly pertains to a new Recreational Vehicle holding tank disposal system for disposing of waste more quickly, cleaner and more sanitarily.

Description of the Prior Art

The use of holding tank disposal apparatuses is known in the prior art. More specifically, holding tank disposal apparatuses heretofore devised and utilized are known to consist basically of familiar, expected and obvious structural configurations, notwithstanding the myriad of designs encompassed by the crowded prior art which have been developed for the fulfillment of countless objectives and requirements. The prior art includes flimsy and flexible hoses which are very hard to manipulate and clean after being used. While these devices fulfill their respective, particular objectives and requirements, the aforementioned patents do not disclose a new Recreational Vehicle holding tank disposal system.

SUMMARY OF THE INVENTION

The general purpose of the present invention, which will be described subsequently in greater detail, is to provide a new Recreational Vehicle holding tank disposal system which has many of the advantages of the holding tank disposal apparatuses mentioned heretofore and many novel features that result in a new Recreational Vehicle holding tank disposal system which is not anticipated, rendered obvious, suggested, or even implied by any of the prior art holding tank disposal apparatuses, either alone or in any combination thereof. The present invention includes a duct assembly including a first pipe with inlet and outlet ends and a bore extending therethrough, a second pipe with an open first end, a second end, and a bore extending therethrough with the second pipe in operable communication with the first pipe, and a flexible hose with open first and second ends and a bore extending therethrough with the flexible hose fastened at the inlet end of the first pipe; a holding tank connector assembly connected to the duct assembly and adapted to be removably connected to a Recreational Vehicle sewage holding tank; and a sewer adapter attachable to the duct assembly and adapted to be removably disposed in a sewer inlet. None of the prior art includes the combination of the elements of the present invention.

There has thus been outlined, rather broadly, the more important features of the Recreational Vehicle holding tank disposal system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new Recreational Vehicle holding tank disposal system which has many of the advantages of the holding tank disposal apparatuses mentioned heretofore and many novel features that result in a new Recreational Vehicle holding tank disposal system which is not anticipated, rendered obvious, suggested, or even implied by any of the prior art holding tank disposal apparatuses, either alone or in any combination thereof.

Still another object of the present invention is to provide a new Recreational Vehicle holding tank disposal system for disposing of waste more quickly with no mess.

Still yet another object of the present invention is to provide a new Recreational Vehicle holding tank disposal system that is easier and more convenient to setup, use, and then store.

Even still another object of the present invention is to provide a new Recreational Vehicle holding tank disposal system that eliminates the risk of disease by disposing of the waste more sanitarily.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
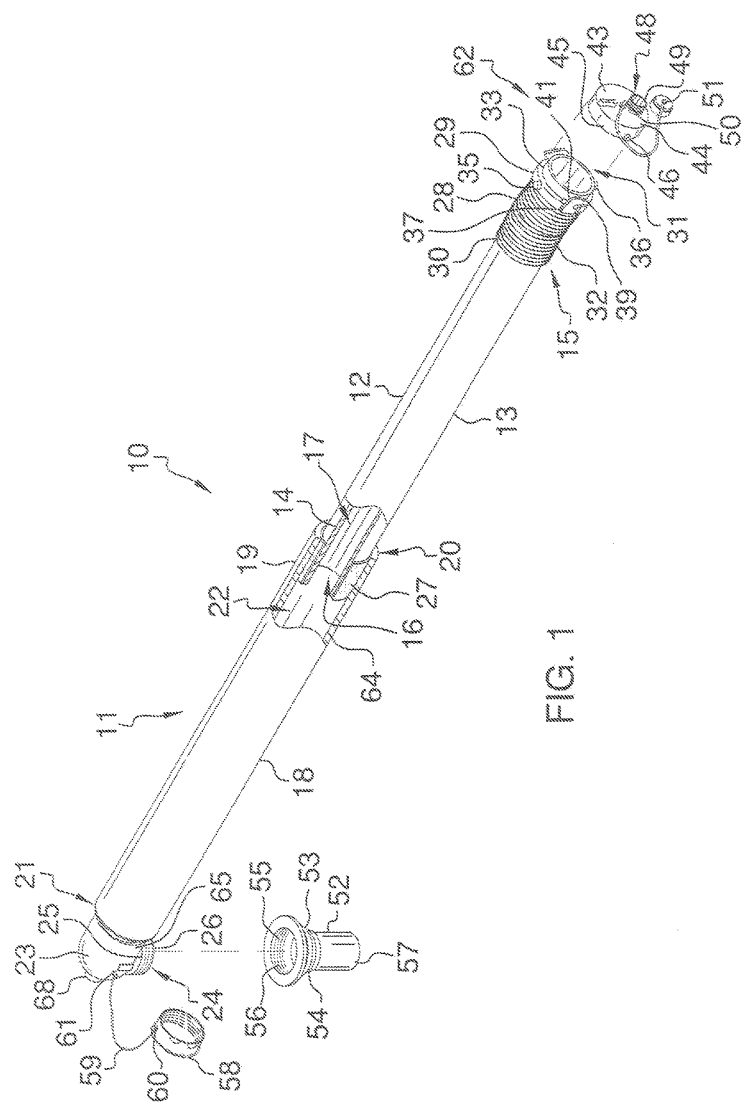
FIG. 1 is an exploded perspective view of a new Recreational Vehicle holding tank disposal system according to the present invention.
Figure 2:
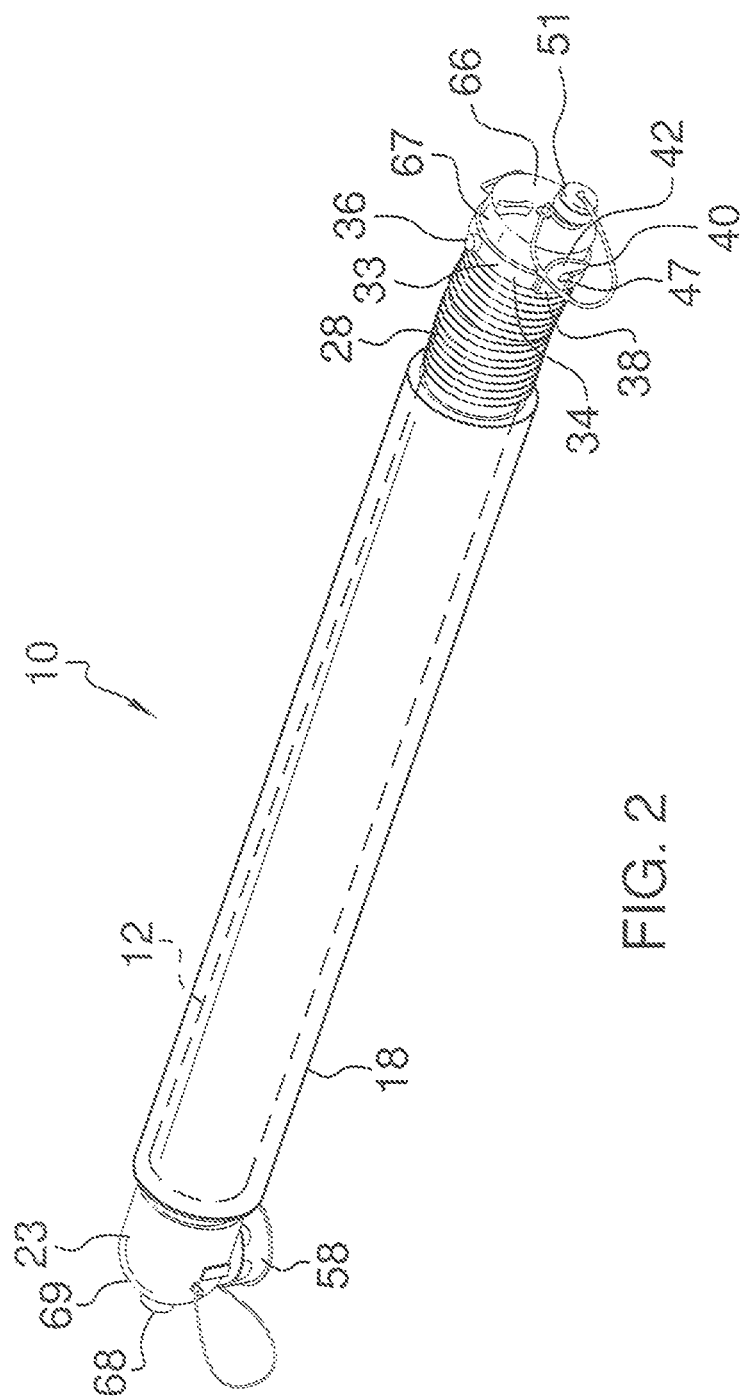
FIG. 2 is a perspective view of the present invention
Figure 3:
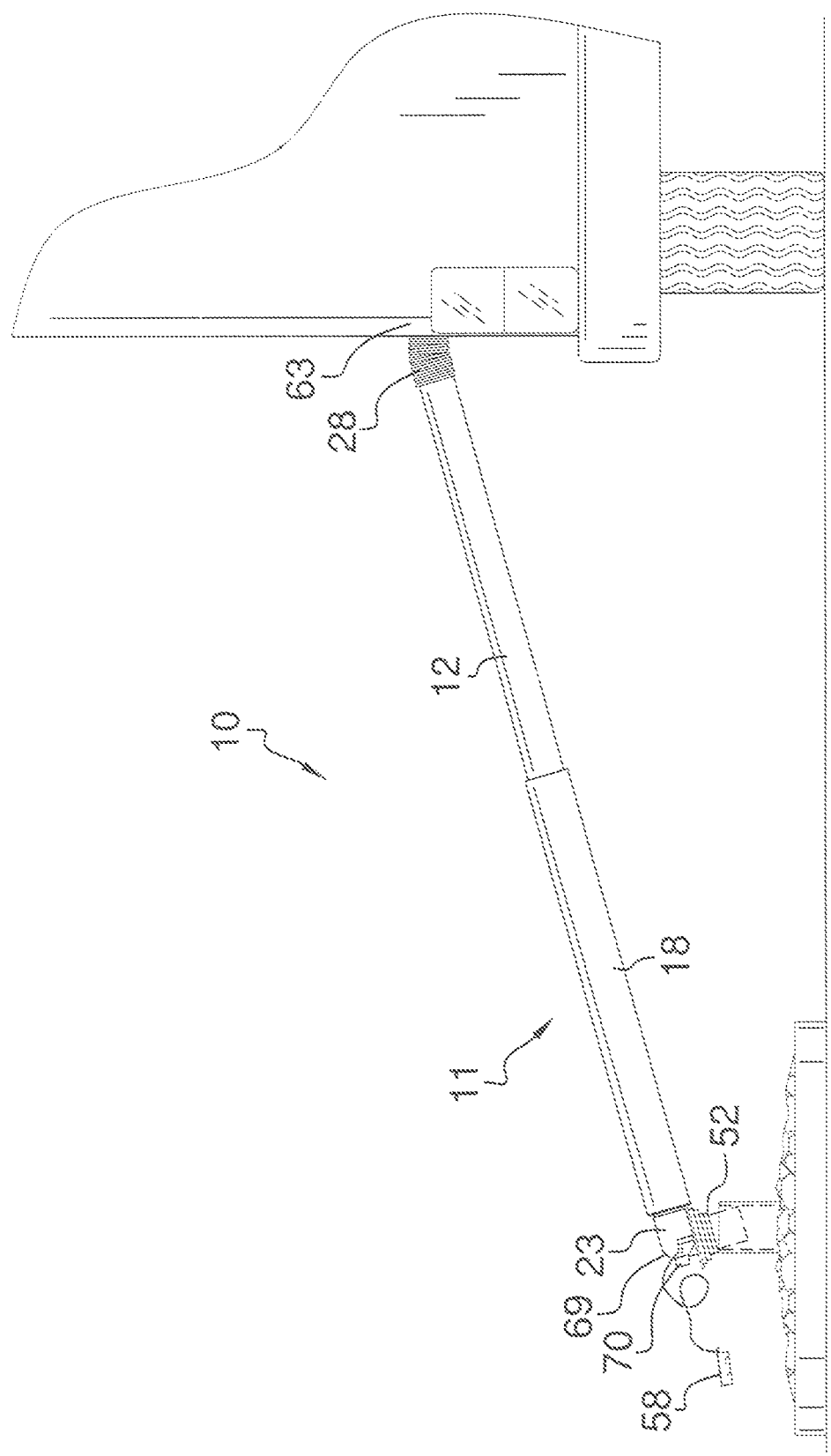
FIG. 3 is a side edge elevation view of the present invention in use showing a partial view of the Recreational Vehicle holding tank drain.

With reference now to the drawings, and in particular to FIGS. 1 through 3 thereof, a new Recreational Vehicle holding tank disposal system embodying the principles and concepts of the present invention and generally designated by the reference numeral 10 will be described.

As best illustrated in FIGS. 1 through 3, the Recreational Vehicle holding tank disposal system 10 may generally comprise a duct assembly 11 including a rigid first pipe 12 with inlet and outlet ends 15, 16 and a bore 17 extending therethrough, a rigid second pipe 18 with an open first end 20, a second end 21, and a bore 22 extending therethrough with the second pipe 18 in operable communication with the first pipe 12, and a flexible hose 28 with open first and second ends 29, 30 and a bore 31 extending therethrough with the flexible hose 28 conventionally fastened with a hose clamp at the inlet end 15 of the first pipe 12, and may also comprise a holding tank connector assembly 62 conventionally connected to the duct assembly 11 and adapted to be removably connected to a sewage holding tank 63, and may further comprise a sewer adapter 52 attachable to the duct assembly 11 and adapted to be removably disposed in a sewer inlet.

As illustrated in FIG. 1, the first pipe 12 may have a perimetrical dimension smaller than that of the second pipe 18 with the first pipe 12 slidably disposed in and telescopingly extendable from the second pipe 18. The first pipe may be slidably disposed through the open first end 20 of the second pipe 18 with the inlet end 15 of the first pipe 12 exposed outside of the second pipe 18. The duct assembly 11 may also include an annular seal 27 conventionally adhered with adhesive to an inner side 64 of a side wall 19 of the second pipe 18 and engagable to an outer side 14 of a side wall 13 of the first pipe 12 to prevent sewage leakage between the first and second pipes 12, 18. The annular seal 27 may be disposed at the first end 20 of the second pipe 18 and may extend a selected distance along and inside the bore 22 of the second pipe 18. The annular seal 27 may be made of rubber silicone. The duct assembly 11 may also have a tubular end portion 23 conventionally disposed at the second end 21 of the second pipe 18 with an opening 24 disposed through a side wall 65 of the tubular end portion 23. The duct assembly 11 may also include a drainage spout 25 conventionally attached to and extending from the tubular end portion 23 and disposed about the opening 24 with the drainage spout 25 having external threads 26 and a longitudinal axis extending perpendicular to a longitudinal axis of the bore 22 through the second pipe 18. The duct assembly 11 may further include a spout member 68 conventionally attached to and extending through an end wall 69 of the tubular end portion 23 with a cap member 70 removably and conventionally attached about the spout member 68 with the spout member 68 adapted to be connected to a garden hose for cleaning out the duct assembly 11.

As shown in FIGS. 1-3, the hose 28 may have a concertinaed side wall 32 for flexibility to connect to the sewage holding tank 63. The duct assembly 11 may further include an end cap 58 removably and conventionally attached to the drainage spout 25 over the opening 24, and also includes a tether 59 having one end 60 conventionally attached to the end cap 58 and another end 61 conventionally attached to the tubular end portion 23 to prevent loss of the end cap 58 when removed from the drainage spout 25.

As illustrated in FIGS. 1-3, the holding tank connector assembly 62 may include a rigid collar 33 conventionally and securely attached at and about the first end 29 of the hose 28, and may also include posts 35, 36 spacedly and conventionally attached and welded to an outer side 34 of the collar 33 and extending outwardly therefrom and adapted to removably connect to the sewage holding tank 63. The holding tank connector assembly 62 may further include fastening members 37, 38 pivotally and conventionally attached to the outer side 34 of the collar 33 with each of the fastening members 37, 38 having a hook 39, 40 at a distal end 41, 42 thereof.

As shown in FIGS. 1-3, the Recreational Vehicle holding tank disposal system 10 may further include a cap assembly 43 removably attached to the collar 33 and including a main cap 66 having an end wall 44 and a side wall 45 depending from a perimeter of the end wall 44. The main cap 66 may have post members 46, 47 conventionally attached to an outer side 67 of the side wall 45 and extending outwardly therefrom and removably engaged to the hooks 39, 40 of the fastening members 37, 38 to removably retain the main cap 66 over and close the first end 29 of the hose 28. The main cap 66 may also have a hole 48 disposed through the end wall 44 with an inlet spout 49 conventionally disposed about the hole 48 and extending outwardly from the end wall 44 with the inlet spout 49 having external threads 50 for connecting to a garden hose to rinse and clean the sewage out of the duct assembly 11. The cap assembly 43 may further include a secondary cap 51 threadable upon the inlet spout 49 to close the hole 48 through the main cap 66.

As illustrated in FIGS. 1-3, the sewer adapter 52 may be a funnel having an upper portion 53 and a lower portion 57 with the upper portion 53 tapered inwardly and downwardly towards the lower portion 57 and having threads 56 on the inner side 55 of a side wall 54 of the upper portion 53. The funnel 52 is removably threaded to the drainage spout 25 with the lower portion 57 adapted to extend into the sewer inlet to drain the sewage from the sewage holding tank 63.

In use, the user could remove the main cap 66 from the collar 33 by unfastening the hooks 39, 40 from the post members 46, 47 on the main cap 66 and then secure the collar 33 to the sewage holding tank 63 using the posts 35, 36 on the collar 33 and remove the end cap 58 from the drainage spout 25 and attach the funnel 52 to the drainage spout 25 and insert the funnel 52 into the sewer inlet and open the sewage holding tank 63 to allow the sewage to drain from the sewage holding tank 63 through the duct assembly 11 and into the sewer inlet. Once the sewage holding tank 63 is completely drained, the user could disconnect the collar 33 from the sewage holding tank 63 and reattach the main cap 66 to the collar 33 and also then remove the secondary cap 51 and attach a garden hose to the inlet spout 49 and turn on a water source connected to the garden hose to rinse and clean the duct assembly 11. In the alternative, the user could attach the end cap 58 to the drainage spout 25 and not attach the main cap 66 to the collar 33 and remove the cap member 70 from the spout member 68 and attach the garden hose to the spout member 68 and run water through and clean out the duct assembly 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the RV holding tank disposal system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Recreational Vehicle holding tank disposal system comprising:
    a duct assembly including a first pipe with inlet and outlet ends and a bore extending therethrough, a second pipe with an open first end, a second end, and a bore extending therethrough with the second pipe in operable communication with the first pipe, and a flexible hose with open first and second ends and a bore extending therethrough with the flexible hose fastened at the inlet end of the first pipe, wherein the first pipe has a perimetrical dimension smaller than that of the second pipe with the first pipe slidably disposed in and telescopingly extendable from the second pipe, wherein the first pipe is slidably disposed through the open first end of the second pipe with the inlet end of the first pipe exposed outside of the second pipe, wherein the duct assembly also includes an annular seal adhered to an inner side of a side wall of the second pipe and engagable to an outer side of a side wall of the first pipe to prevent sewage leakage between the first and second pipes;

a holding tank connector assembly connected to the duct assembly and adapted to be removably connected to a recreational vehicle sewage holding tank; and a sewer adapter attachable to the duct assembly and adapted to be removably disposed in a sewer inlet.

2. The Recreational Vehicle holding tank disposal system as described in claim 1, wherein the annular seal is disposed at the first end of the second pipe and extends a selected distance along and inside the bore of the second pipe, wherein the annular seal is made of rubber silicone.

3. A Recreational Vehicle holding tank disposal system comprising:

a duct assembly including a first pipe with inlet and outlet ends and a bore extending therethrough, a second pipe with an open first end, a second end, and a bore extending therethrough with the second pipe in operable communication with the first pipe, and a flexible hose with open first and second ends and a bore extending therethrough with the flexible hose fastened at the inlet end of the first pipe, wherein the first pipe has a perimetrical dimension smaller than that of the second pipe with the first pipe slidably disposed in and telescopingly extendable from the second pipe, wherein the duct assembly has a tubular end portion at the second end of the second pipe with an opening disposed through a side wall of the tubular end portion, wherein the duct assembly also includes a drainage spout attached to and extending from the end portion and disposed about the opening with the drainage spout having external threads and a longitudinal axis extending perpendicular to a longitudinal axis of the bore through the second pipe;

a holding tank connector assembly connected to the duct assembly and adapted to be removably connected to a recreational vehicle sewage holding tank; and a sewer adapter attachable to the duct assembly and adapted to be removably disposed in a sewer inlet.

4. The Recreational Vehicle holding tank disposal system as described in claim 3, wherein the duct assembly further includes an end cap removably attached to the drainage spout over the opening, and also includes a tether having, one end attached to the end cap and another end attached to the tubular end portion to prevent loss of the end cap when removed from the drainage spout.

5. The Recreational Vehicle holding tank disposal system as described in claim 3, wherein the sewer adapter is a funnel having an upper portion and a lower portion with the upper portion tapered inwardly and downwardly towards the lower portion and having threads on the inner side of a wall of the upper portion; whereupon the funnel is removably threaded to the drainage spout with the lower portion adapted to extend into the sewer inlet to drain the sewage from the sewage holding tank.

6. The Recreational Vehicle holding tank disposal system as described in claim 3, wherein the duct assembly further includes a spout member attached to and extending through an end wall of the tubular end portion with a cap member removably and conventionally attached about the spout member with the spout member adapted to be connected to a garden hose for cleaning out the duct assembly.

7. A The Recreational Vehicle holding tank disposal system comprising:

a duct assembly including a first pipe with inlet and outlet ends and a bore extending therethrough, a second pipe with an open first end, a second end, and a bore extending therethrough with the second pipe in operable communication with the first pipe, and a flexible hose with open first and second ends and a bore extending therethrough with the flexible hose fastened at the inlet end of the first pipe, wherein the first pipe has a perimetrical dimension smaller than that of the second pipe with the first pipe slidably disposed in and telescopingly extendable from the second pipe, wherein the hose has a concertinaed side wall for flexibility to connect to the recreational vehicle sewage holding tank;

a holding tank connector assembly connected to the duct assembly and adapted to be removably connected to a recreational vehicle sewage holding tank, wherein the holding tank connector assembly includes a collar attached at and about the first end of the hose, and also includes posts spacedly attached to an outer side of the collar and extending outwardly therefrom and adapted to removably connect to the sewage holding tank; and a sewer adapter attachable to the duct assembly and adapted to be removably disposed in a sewer inlet.

8. The Recreational Vehicle holding tank disposal system as described in claim 7, wherein the holding tank connector assembly further includes fastening members pivotally attached to the outer side of the collar with each of the fastening, members having a hook at a distal end thereof.

9. The Recreational Vehicle holding tank disposal system as described in claim 8 further includes a cap assembly removably attached to the collar and including a main cap having an end wall and a side wall depending from a perimeter of the end wall.

10. The Recreational Vehicle holding tank disposal system as described in claim 9, wherein the main cap has post members attached to an outer side of the side wall and extending outwardly therefrom and removably engaged to the hooks of the fastening members to removably retain the main cap over and close the first end of the hose.

11. The Recreational Vehicle holding tank disposal system as described in claim 10, wherein the main cap also has a hole disposed through the end wall with a inlet spout disposed about the hole and extending outwardly from the end wall with the inlet spout having external threads for connecting to a garden hose to rinse and clean the sewage out of the duct assembly, wherein the cap assembly further includes a secondary cap threadable upon the inlet spout to close the hole through the main cap.

* * * * *